United States Patent [19]

Sham

[11] Patent Number: 5,680,810

[45] Date of Patent: Oct. 28, 1997

[54] STEAM TOASTER OVEN

[76] Inventor: John C. K. Sham, Rm. 1508, Block C, 19 Broadhead Road, Hong Kong, Hong Kong

[21] Appl. No.: 759,327

[22] Filed: Dec. 2, 1996

Related U.S. Application Data

[60] Provisional application No. 60/023,624, Aug. 9, 1996.

[51] Int. Cl.$^6$ .............................. A47J 27/04; A47J 37/04; A21B 1/00

[52] U.S. Cl. ...................... 99/330; 99/339; 99/468; 99/476; 99/483; 99/516; 126/20; 126/369; 219/385; 219/401

[58] Field of Search ..................... 99/325–332, 339, 99/340, 400, 401, 444–446, 467, 468, 469, 473–476, 480, 483, 516, 534, 536; 126/20, 21 A, 369, 369.1, 369.2, 20.1, 20.2; 219/401, 444, 442, 385, 386, 521; 426/510, 523

[56] References Cited

U.S. PATENT DOCUMENTS

| | | | |
|---|---|---|---|
| 4,430,557 | 2/1984 | Eichelberger et al. | 99/340 X |
| 4,722,268 | 2/1988 | Rightley | 99/468 |
| 4,810,856 | 3/1989 | Jovanovic | 219/401 |
| 4,817,582 | 4/1989 | Oslin et al. | 99/474 X |
| 4,851,644 | 7/1989 | Oslin | 219/401 X |
| 4,924,072 | 5/1990 | Oslin | 219/492 X |
| 5,025,132 | 6/1991 | Fortmann et al. | 392/399 X |
| 5,080,087 | 1/1992 | McFadden et al. | 126/20 |
| 5,164,161 | 11/1992 | Feathers et al. | 219/401 X |
| 5,272,963 | 12/1993 | Del Fabbro | 99/468 |
| 5,365,039 | 11/1994 | Chaudoir | 99/468 |
| 5,515,773 | 5/1996 | Bullard | 99/330 |
| 5,545,874 | 8/1996 | Hansson | 126/21 A |

*Primary Examiner*—Timothy F. Simone
*Attorney, Agent, or Firm*—Salzman & Levy

[57] ABSTRACT

The present invention features a toaster oven that can both steam and heat food. While this toaster oven works in the traditional sense, it also has the capability of rapidly generating and introducing steam into the cooking chamber. The steam is generated in a water tube or a boiling pan that is placed adjacent the toaster oven's infrared heating coils. Water for making steam is introduced into a reservoir located in the toaster oven's housing. The reservoir can be either permanently situated in the housing, or it can be of the removable, refillable type, that is, a container that can be filled and cleaned periodically. A microprocessor controls both the steam generation and the heating cycles. The microprocessor is operative via a computer routine that monitors sensors that are positioned about the housing of the toaster oven. The microprocessor also meters the water flowing from the reservoir into the water tubes or boiling pan. A one-way valve ensures that the water flow is positively directed into the water tubes or the boiling pan. A control knob located on the toaster oven's control panel allows a user to select the amount of steam being injected into the cooking chamber.

20 Claims, 10 Drawing Sheets

5,680,810

STEAM TOASTER OVEN

This application claims the benefit of U.S. Provisional Application No. 60/023,624, filed Aug. 9, 1996.

FIELD OF THE INVENTION

The present invention pertains to cooking appliances and, more particularly, to a traditional toaster oven in which steam is introduced, whereby a new toaster appliance is formed, one having improved capabilities for cooking.

BACKGROUND OF THE INVENTION

Toaster ovens have now become ubiquitous cooking appliances. People find that simple meals can thus be prepared quickly and with great ease. Hence, the toaster oven has become a handy appliance for the frenetic times in which we live.

Today's toaster ovens combine a capabilities for baking, broiling and toasting into a single cooking unit. Despite their versatility, however, toaster ovens do have several deficiencies. One of the toaster oven's drawbacks is its inability to accomplish more weighty cooking tasks, e.g., cooking a turkey, wherein constant basting is required, prevents a toaster oven from providing a moist and tender product. Obviously, no one would consider using a toaster oven for such a purpose. In fact, most cooks would never seriously consider baking a roast or a cake in a toaster oven, irrespective of a given appliance's range of ability to perform these tasks. Commercial toaster ovens are generally small in size; that reason alone precludes their performing a variety of stock cooking tasks. Additionally, they are marketed as convenience appliances, e.g., a quick means to rewarm leftover food, cook frozen dinners or toast bread.

Another of the toaster oven's drawbacks is its inability to thoroughly and evenly cook food. The heating coils of a toaster oven are positioned above and below the cooking platform. The heat is almost entirely transmitted by infrared radiation, with very little convection taking place in the oven space. This directed heating often chars the surfaces of food before their innermost areas are even warm.

Still another problem with a toaster oven is its inability to prevent dehydration of food, thus producing food that lacks succulent flavor and obvious freshness.

The present invention provides a toaster oven that will cook food more evenly, more thoroughly and faster than similar appliances heretofore. In addition, the current invention is a toaster oven that will keep food moist and succulent by introducing steam substantially instantaneously into its heating chamber. Steaming the food enhances its flavor, while simultaneously inhibiting charring or burning.

DISCUSSION OF RELATED ART

In U.S. Pat. No. 5,515,773 (issued to BULLARD on May 14, 1996, and entitled "Steam Oven"), a steam oven is shown, having a water receiving compartment and a separate boiling compartment. The boiling compartment "communicates" with the receiving compartment, which, in turn, is fed by a water reservoir. A barrier retards any heat transfer from the boiling compartment to the receiving compartment, in order to prevent air flow through a discharge valve and thereby causing an untimely release of water from the water tank into the reservoir.

The present invention differs from the above-identified, patented steam oven in that Applicant's toaster oven configuration is quite convenient and efficient with respect to making steam. The water-conveying tubes from the reservoir are designed to be contiguously adjacent the toaster oven's heating coils; thus, steam is generated very rapidly, i.e., substantially instantaneously as the toaster oven cooks the food. This design allows for large quantities of steam to be available at all times. A special control knob disposed on the control panel of the toaster oven allows the user to select the amount of steam to be injected into the heating chamber. This flexibility, coupled with microprocessor control of both the heating and steam cycles, provides a vastly superior steam oven than that heretofore designed.

In U.S. Pat. No. 4,810,856 (issued to JOVANOVIC on Mar. 7, 1989, and entitled "Rotary-spit Steam Cooking Apparatus"), an infrared cooking oven is illustrated, wherein a separate boiler produces steam that is fed into the spit.

As aforementioned, the present invention is more efficient and highly versatile, as compared to the device of the aforesaid patent. Applicant's invention allows for both the rapid, i.e., substantially instantaneously, and continuous generation of steam via contiguous water and heating coil contact. Further, Applicant's steam oven is highly controllable, both digitally (by utilizing a cooking computer routine) and individually (by choosing a steam selection setting via a panel control knob).

SUMMARY OF THE INVENTION

In accordance with the present invention, there is provided a toaster oven that can both steam and heat food. While this toaster oven works in the traditional sense, it also has the capability of rapidly, i.e., substantially instantaneously, generating and introducing steam into the cooking chamber. The steam is generated in a water tube or a boiling pan that is placed adjacent the toaster oven's infrared heating coils. Water for making steam is introduced into a reservoir disposed in the toaster oven's housing. The reservoir can be either permanently disposed in the housing, or it can be of the removable, refillable type, i.e., a container that can be filled and cleaned periodically. The oven may be equipped with either conventional, manual controls or with microprocessor-based, automatic or semi-automatic controls for both the steam generation and the heating cycles. The microprocessor, if employed, is operative via a computer routine that monitors sensors disposed about the housing of the toaster oven. The microprocessor also meters the water flowing from the reservoir into the water tubes or boiling pan. A one-way valve ensures that the water flow is positively directed into tubes or a boiling pan. A control knob disposed on the toaster oven's control panel allows a user to select the amount of steam being injected into the cooking chamber. When a microprocessor control system is not used, temperature, cooking time, and steam cycles are controlled by means of conventional, manual controls well known in the art.

BRIEF DESCRIPTION OF THE DRAWINGS

A complete understanding of the present invention may be obtained by reference to the accompanying drawings, when considered in conjunction with the subsequent, detailed description thereof, in which.

DESCRIPTION OF THE PREFERRED EMBODIMENT

Generally speaking, this invention features a steam toaster oven that generates a steady amount of steam for its optional injection into a heating chamber of the cooking appliance. Cooking mode, temperature, and steam may all be controlled by conventional, manual controls. The amount of steam introduced into the heating chamber is manually controlled by means of a selection knob disposed on a control panel of the oven. Both the heating and the steaming cycles may be controlled by a microprocessor that utilizes a program for cooking.

Figure 1:
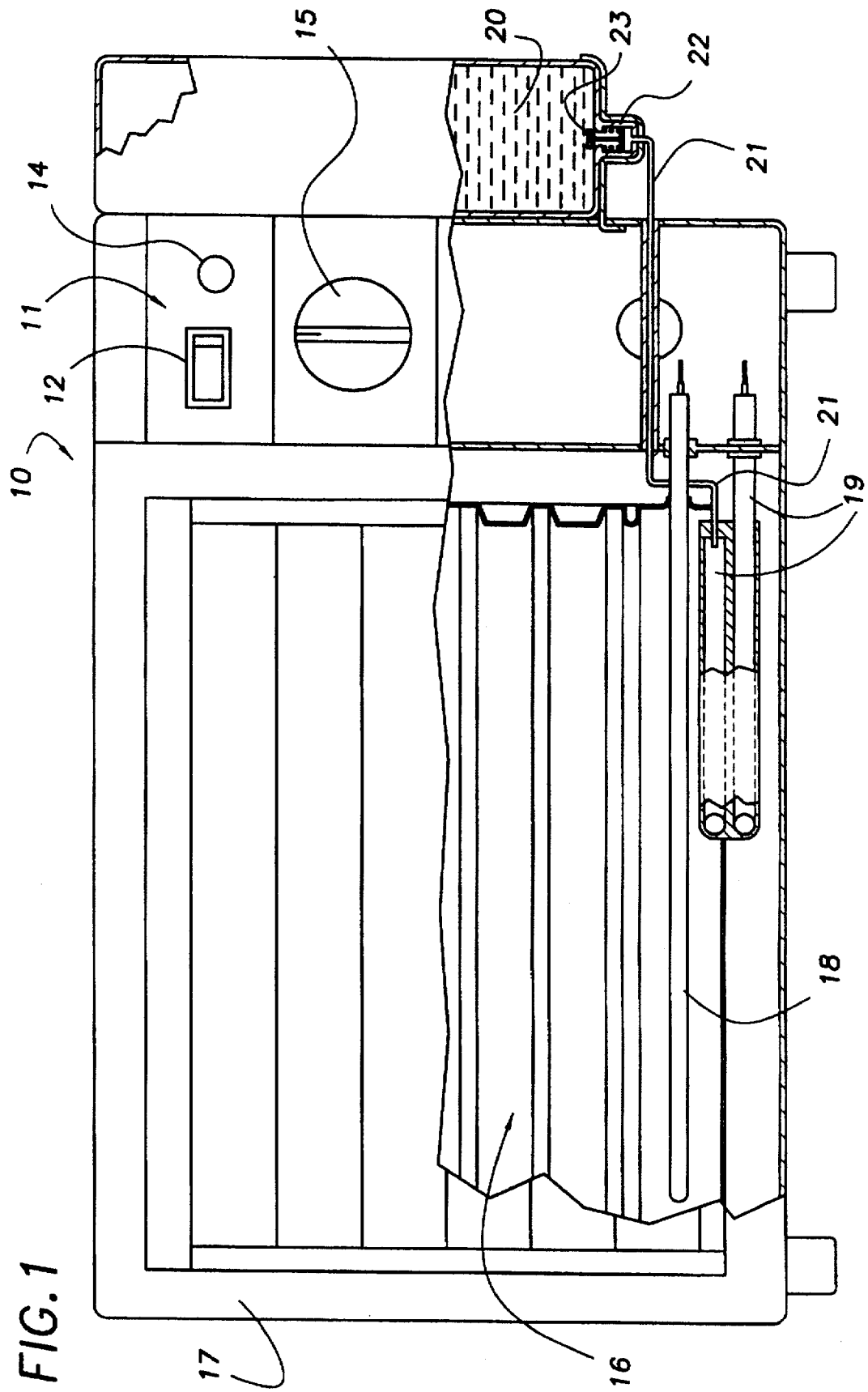
FIG. 1 illustrates a cutaway, front view of the steam toaster oven of this invention.
Figure 10B:
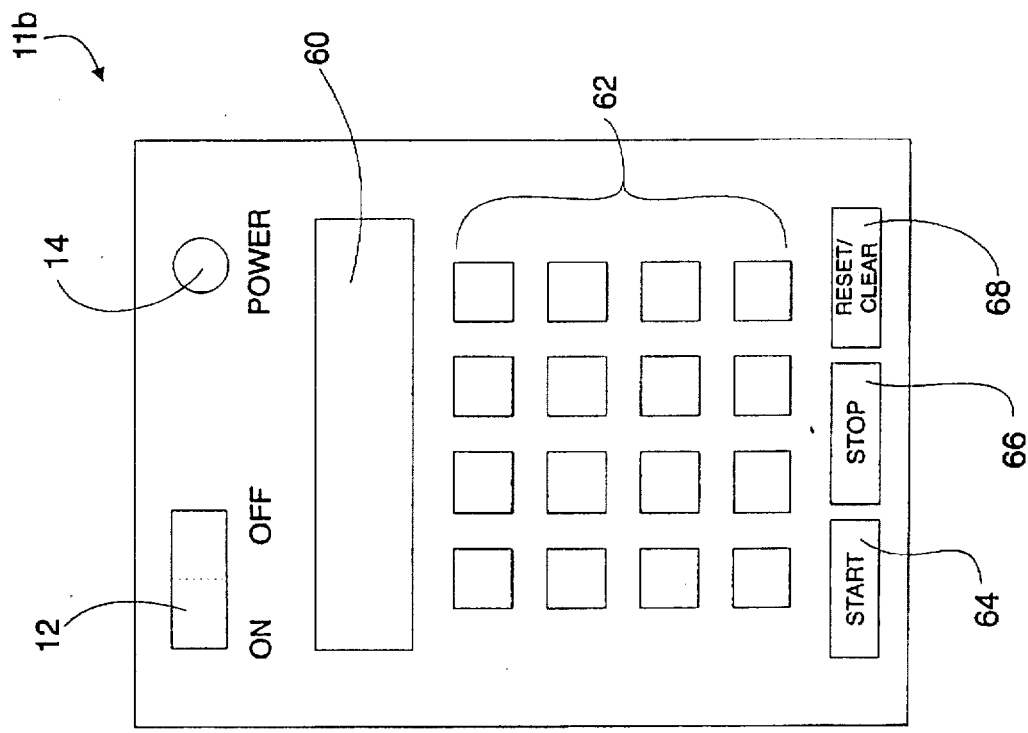
FIG. 10b shows a typical control panel for a microprocessor-based control system for the steam toaster oven.
Figure 10A:
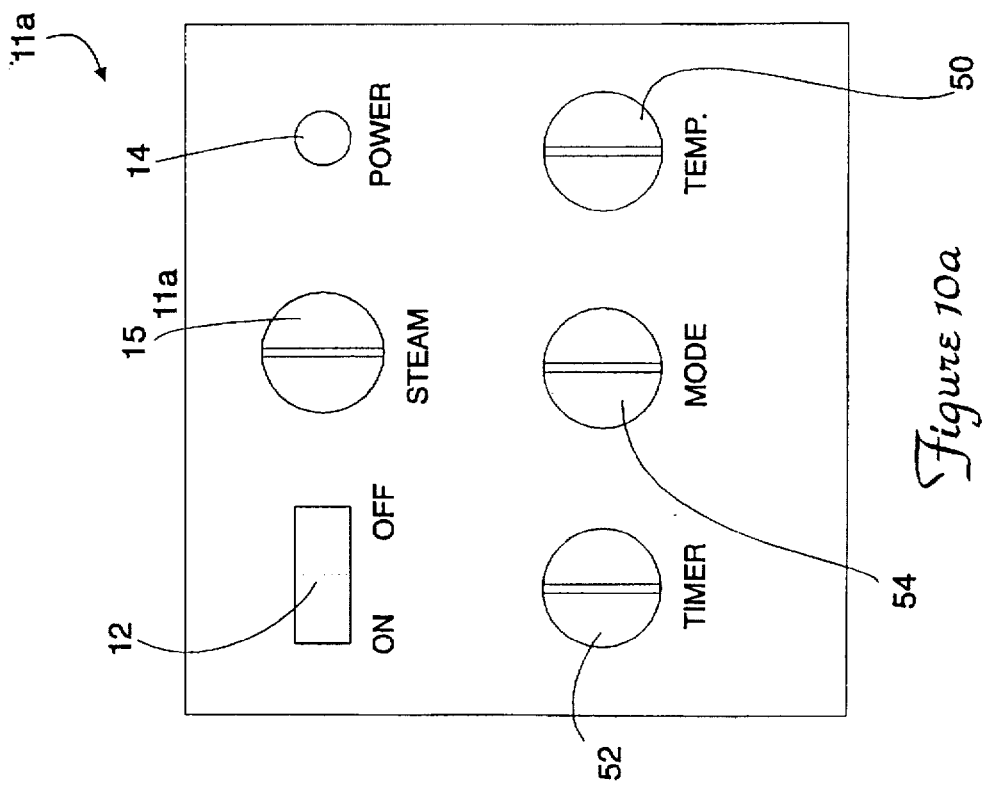
FIG. 10a shows a typical control panel with manual controls for the steam toaster oven.

Now referring to FIG. 1, the steam toaster oven 10 of this invention is shown. The oven 10 comprises a control panel 11, which features an on-off switch 12; an LED, power-indicator light 14; and a control knob 15 for selecting the rate of steam injected into the cooking chamber 16. A typical control panel with other manual controls for cooking mode, time and temperature are shown in FIG. 10a. A typical control panel for a microprocessor-controlled steam toaster oven is shown in FIG. 10b.

Figure 2:
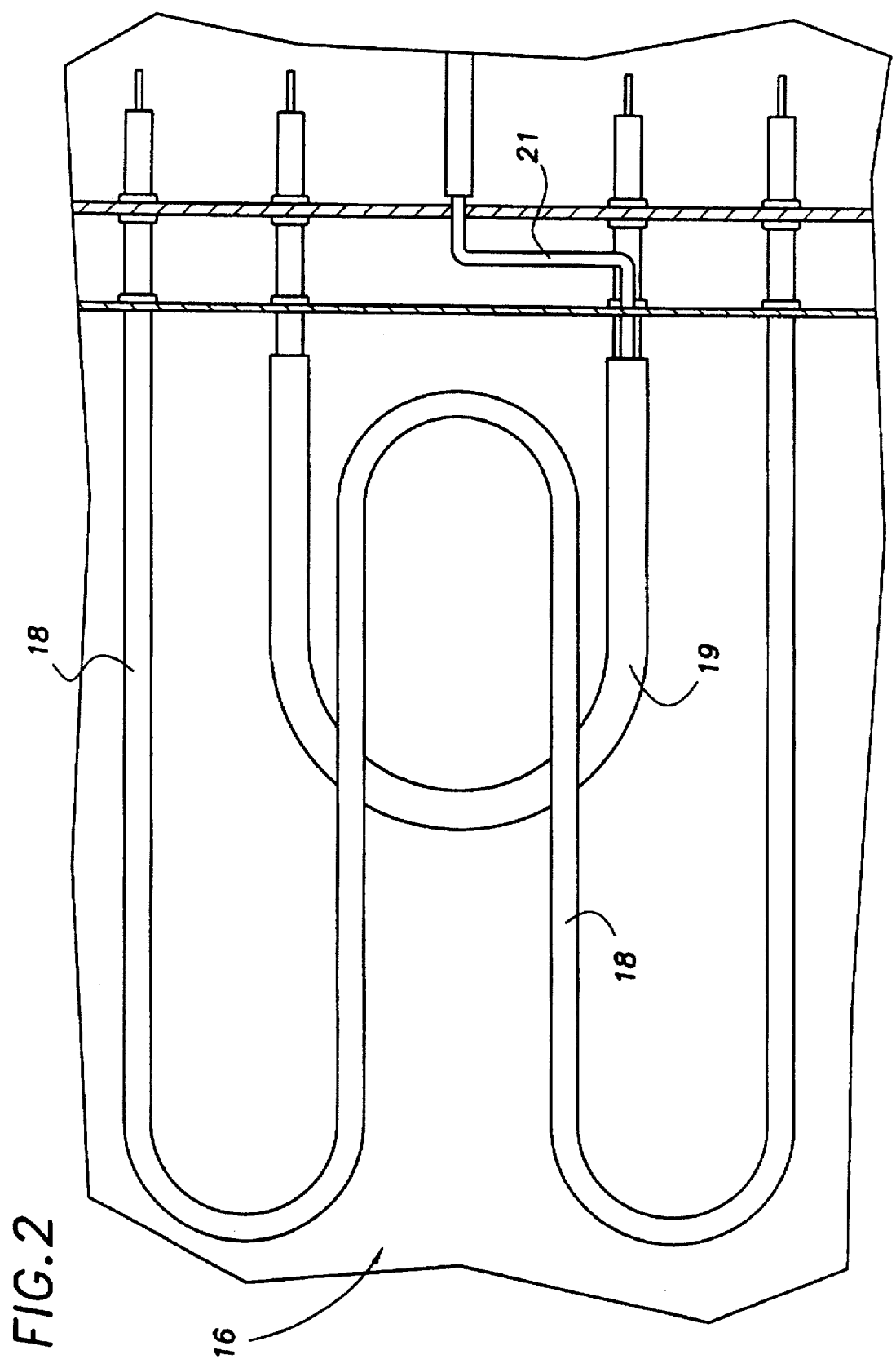
FIG. 2 depicts a top view of the steam-generating and infrared heating tubes of the steam toaster oven shown in FIG. 1.

The steam toaster oven 10 also features a housing 17 that supports traditional infrared heating coils 18 for providing radiant heat to the cooking chamber 16. A more detailed view of the heating coils 18 is seen in FIG. 2.

Steam is introduced into the steam toaster oven 10 through a steam-generating tube 19. This tube 19 is contiguously adjacent the heating coils 18, receiving heat therefrom in order to quickly boil the water disposed therein. The tube 19 receives the water for generating steam from water reservoir 20. Reservoir 20 can comprise a permanently mounted tank or a refillable, removable container. The design having a refillable, removable container is advantageous in that it provides an easy way to clean the reservoir of sediments. Water supplied to the steam-generating tube 19 is conveyed from the reservoir by means of a conduit 21, connected to a one-way valve 22 disposed in the bottom of reservoir 20. The water from the reservoir 20 is gravity-fed to the conduit 21. The control knob 15 changes the position of the seat 23 of the valve 22, thus metering the amount of water being fed to conduit 21, and hence controlling the rate of steam generation.

Steam generated in the tube 19 is delivered into the cooking chamber 16 through small, spaced-apart orifices (not shown) that are disposed periodically along the tube 19.

Figure 9:
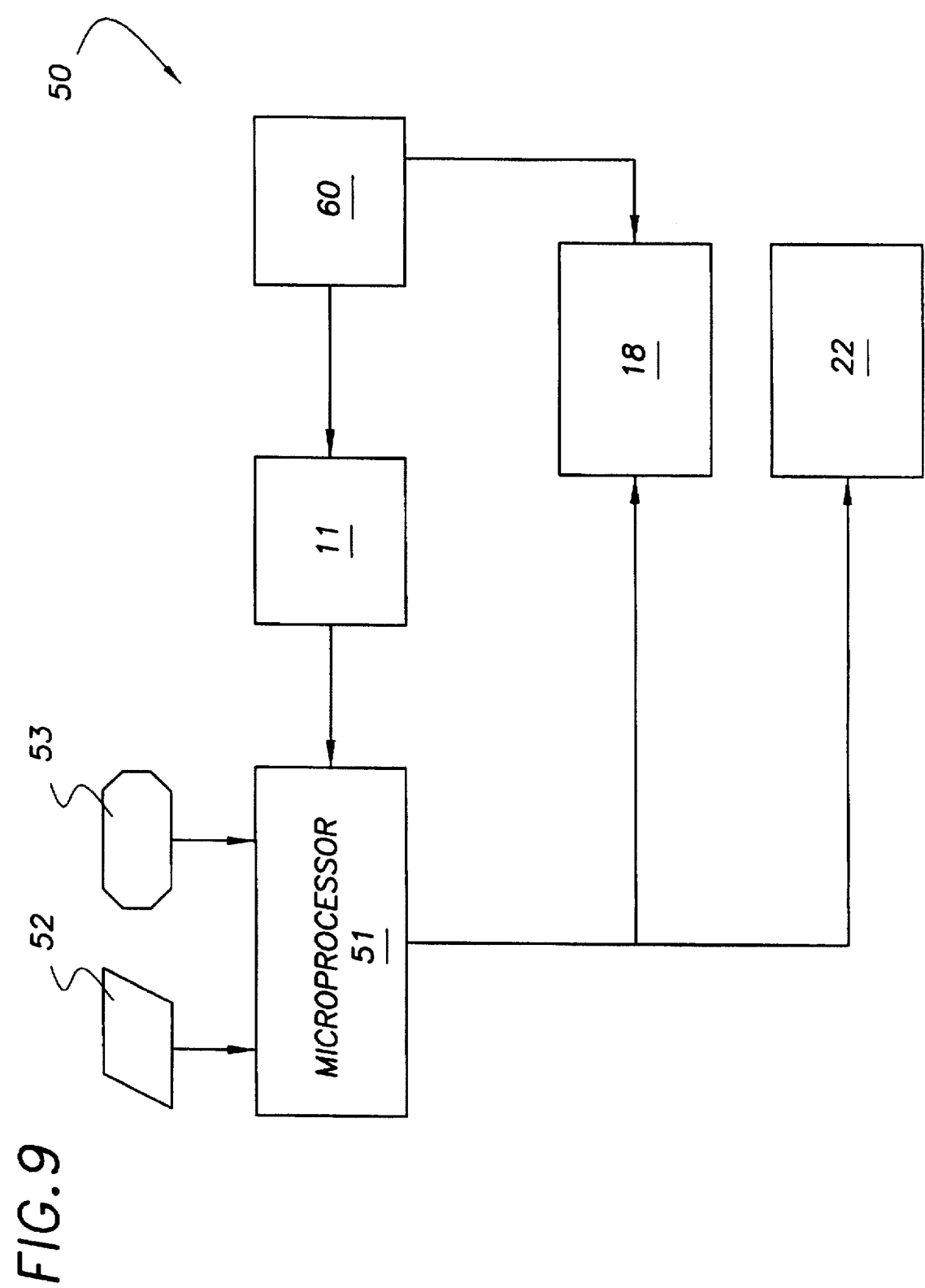
FIG. 9 shows a schematic circuit diagram for the steam toaster oven of this invention.

Referring to FIG. 9, a schematic circuit diagram 50 is shown. When a microprocessor-based control system is present, the inventive steam toaster oven 10 is operated by circuit 50. The circuit 50 comprises a microprocessor 51 (preferably digital) that controls both the heating and the steam cycles of the oven 10. A heating sensor, usually a thermistor 52 disposed in the cooking chamber 16 senses the oven temperature therein. The sensor 52 sends a signal to the microprocessor 51, which, in turn, controls whether or not the heating coil 18 receives electrical power from the electrical power source 60. This power source 60 powers both the control panel 11 and the microprocessor 51, as illustrated. The microprocessor 51 receives control signals from the control panel 11, and uses these signals via its internal programming to operate the steam toaster oven 10 in its various operative modes.

A humidity sensor 53 sends a signal to the microprocessor 51 to inform it to close the water supply valve 22. Hence, the water for steam generation can be switched off, when the chamber's humidity reaches an operative level. When no microprocessor-based control system is present, manual controls (FIG. 10a) and a conventional wiring arrangement (not shown) are utilized, as is well known in the art.

Figure 3:
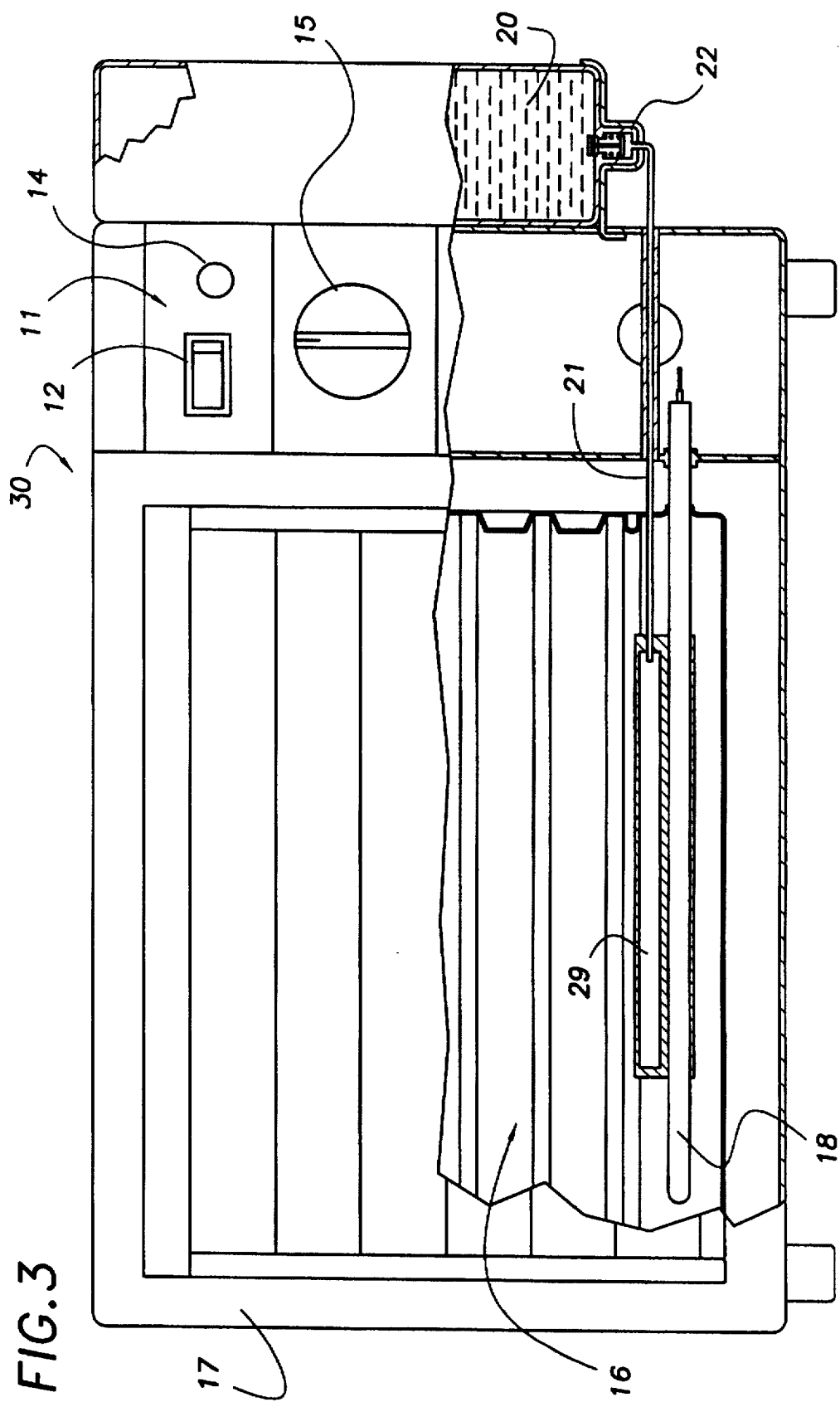
FIG. 3 shows a cutaway, front view of an alternate embodiment of the steam toaster oven illustrated in FIG. 1.
Figure 4:
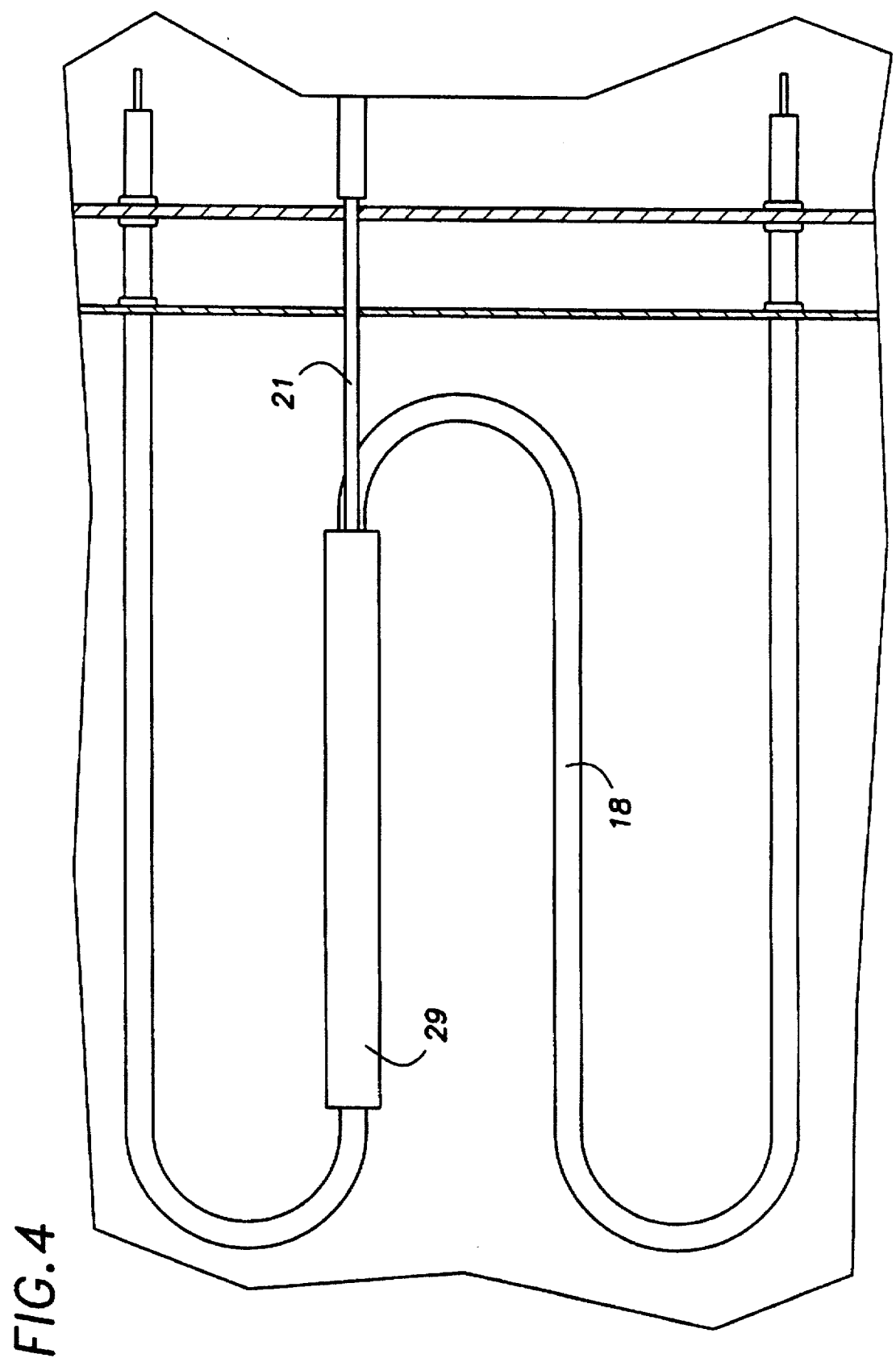
FIG. 4 depicts a top view of the steam-generating and infrared heating tubes of the alternate embodiment shown in FIG. 3.

Referring to FIGS. 3 and 4, another embodiment of the steam toaster oven 10 of FIG. 1 is illustrated. The steam toaster oven 30 of this embodiment comprises a steam-generating tube 29 that is aligned with a portion of the heating coil 18. This alignment allows for a greater heat transfer from the heating coil 18 to the steam-generating tube 29 (due to the closer contiguity of these parts). After the application of electrical power to heating coil 18, steam is generated even more quickly than in the previous embodiment. Control systems, whether manual or microprocessor-based, are well known in the art. The control system per se, except as it pertains to the generation and control of steam, is not considered part of the instant invention.

Figure 5:
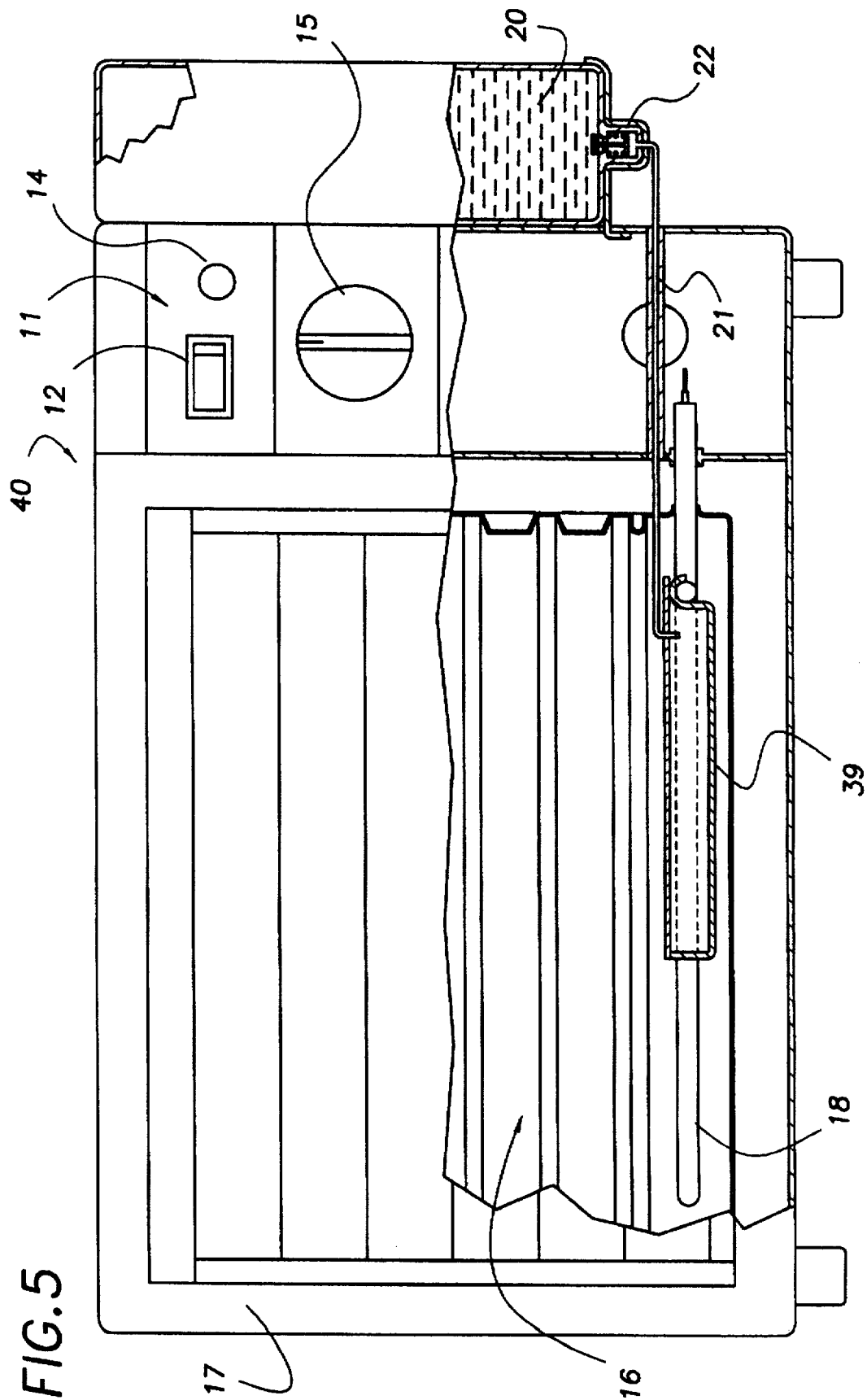
FIG. 5 illustrates a cutaway, front view of a second, alternate embodiment of the steam toaster oven shown in FIG. 1.
Figure 6:
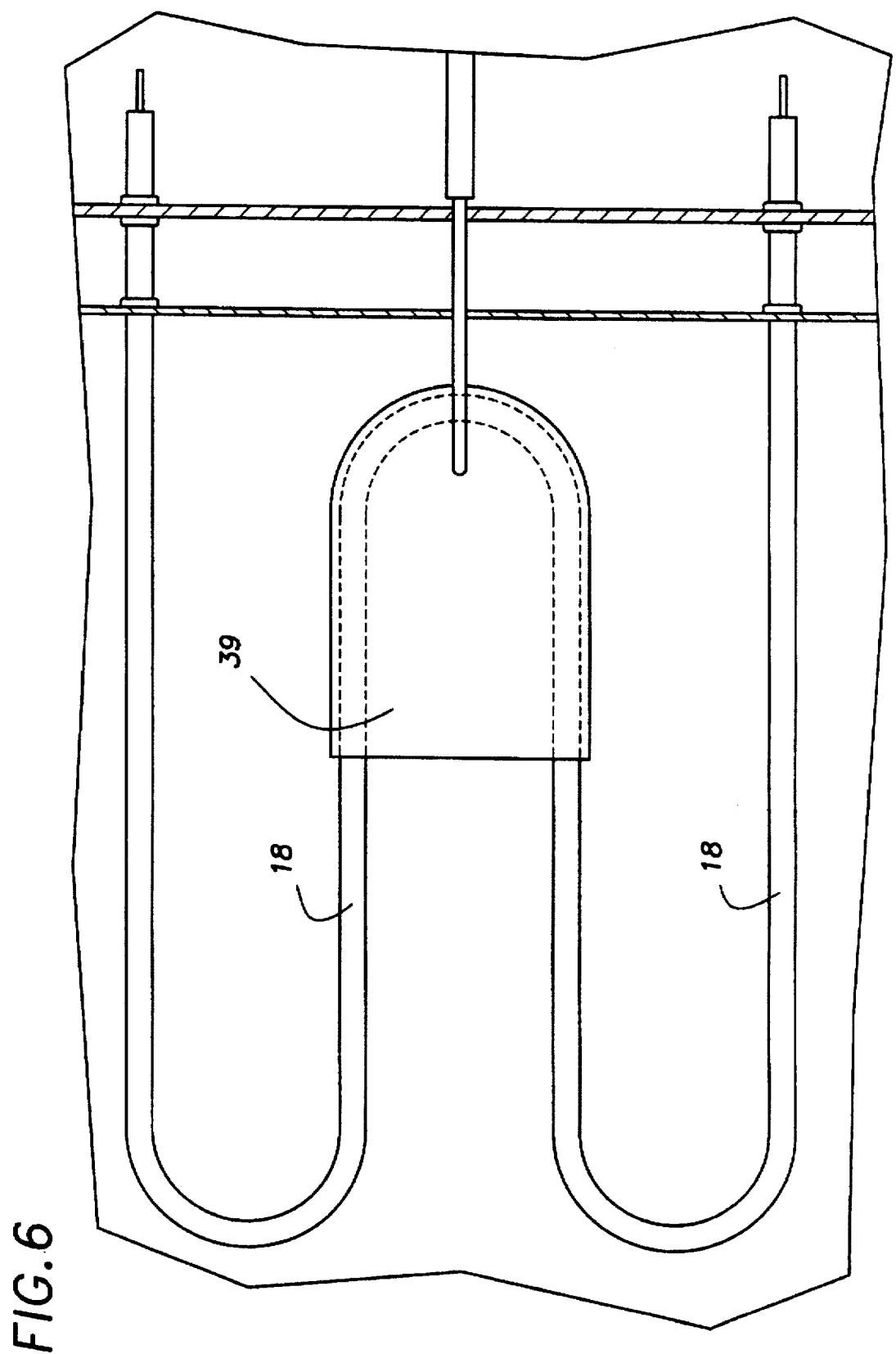
FIG. 6 shows a top view of the steam-generating and infrared heating tubes of the second, alternate embodiment depicted in FIG. 5.

Referring to FIGS. 5 and 6, a second, alternate embodiment of the steam toaster oven 10 of FIG. 1 is illustrated. The steam toaster oven 40 of this embodiment comprises a steam-generating, boiling chamber 39 that is aligned with and encompasses a portion of the heating coil 18. This form of alignment also allows for greater heat transfer from the heating coil 18 to the steam-generating, boiling chamber 39, due to the closer contiguity of the parts. With this embodiment, there is a more rapid steam generation, due to the larger, heated surface area of the boiling chamber 39.

Figure 7:
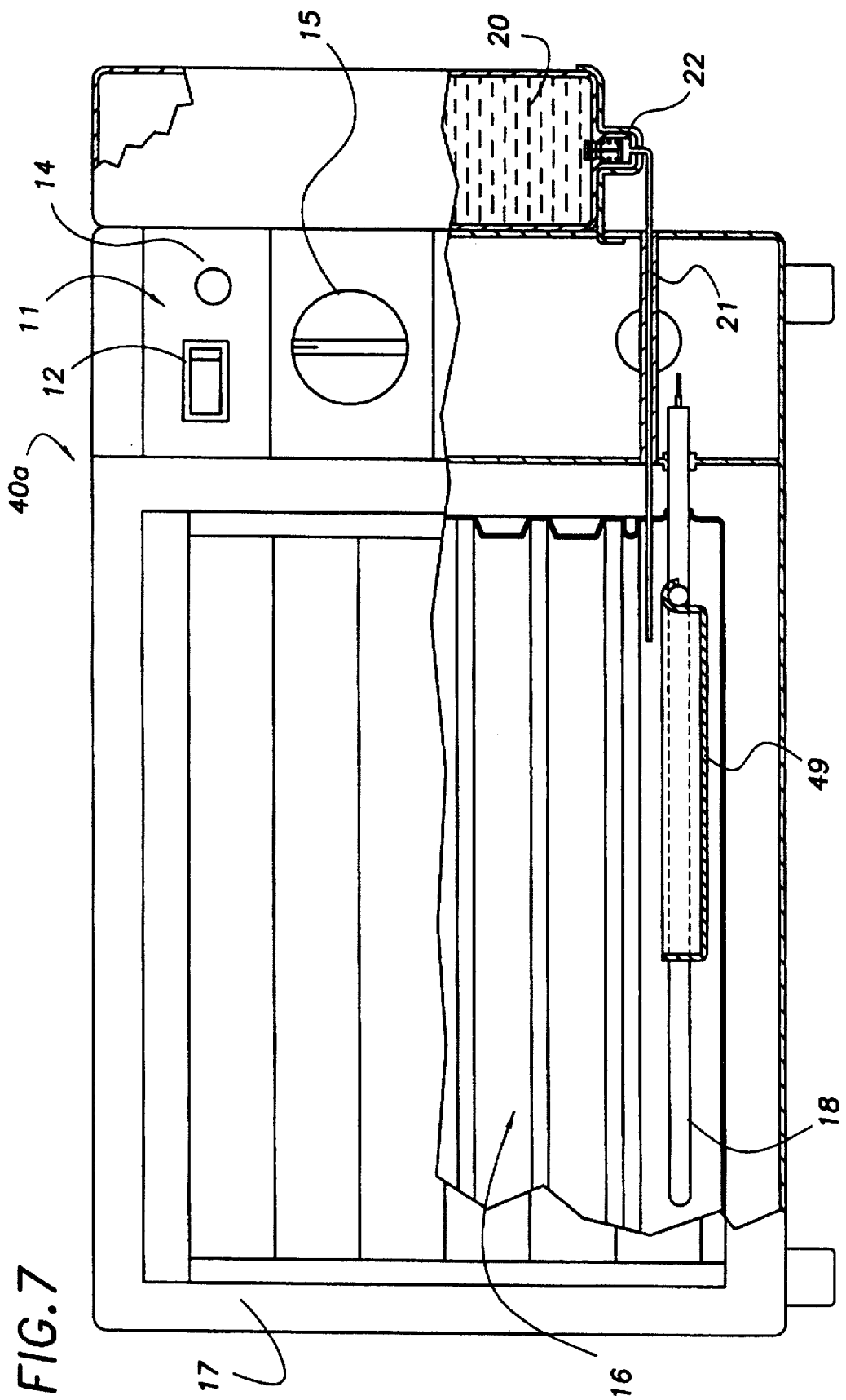
FIG. 7 depicts a cutaway, front view of a third, alternate embodiment of the steam toaster oven illustrated in FIG. 1.
Figure 8:
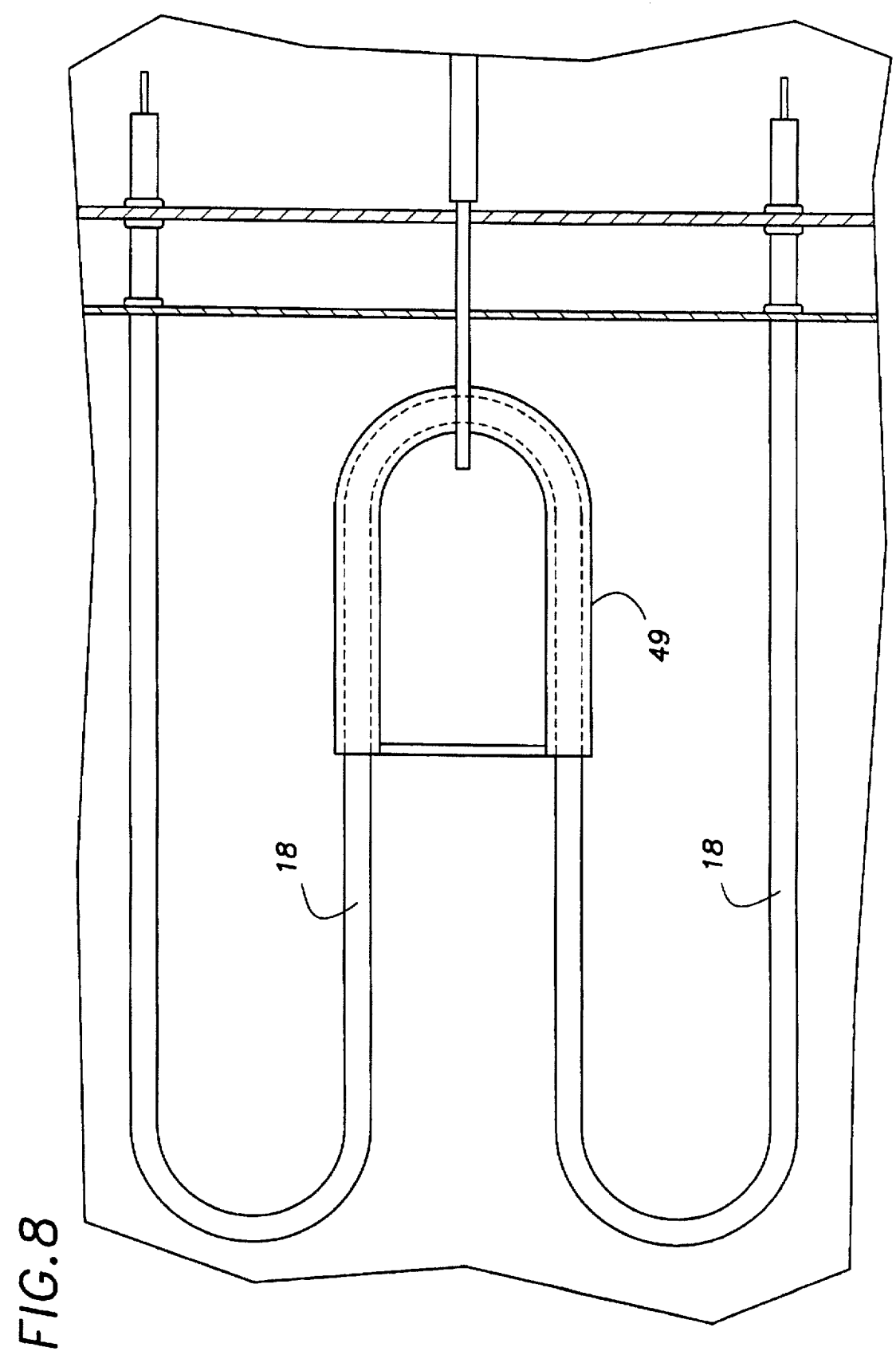
FIG. 8 illustrates a top view of the steam-generating and infrared heating tubes of the third, alternate embodiment of the steam toaster oven shown in FIG. 7.

Referring to FIGS. 7 and 8, a third, alternate embodiment of the steam toaster oven 10 of FIG. 1 is illustrated. The steam toaster oven 40a of this embodiment comprises a steam-generating, boiling pan 49 that is aligned with and encompasses a portion of the heating coil 18. This alignment, as well, allows for greater heat transfer from the heating coil 18 to the steam-generating, boiling pan 49, due to the closer contiguity of the parts. With this embodiment, steam generation is generally slower than in the previous two embodiments, because there may be significantly more water present in the boiling pan 49 than in the steam-generator tubes 39 employed in the earlier embodiments. All of the water in boiling pan 49 must be heated to its boiling point before steam is generated. Once the water is boiling, the steam generated by the boiling pan 49 enters the heating chamber 16 at a more rapid rate, because the pan is uncovered and, hence, open to the chamber environment.

Referring now to FIG. 10a, there is shown a typical control panel 11a which could be employed with the steam toaster oven of the present invention. Controls include a power on/off switch 12, a mode selection control 50, a timer 52, a temperature controller (thermostat) 54 and a steam control valve 15. Also included is a power indicator light 14. It should be obvious to anyone skilled in the art that control functions could be combined or performed with devices other than rotary knobs.

Referring now to FIG. 10b, there is shown a typical control panel 11b for a microprocessor-controlled steam toaster oven. A power on/off switch 12 and power indicator light 14 are present as in the manual control panel 11a. An LCD or similar type display 60 is used to enter cooking parameters such as mode, temperature, or time and to display operational status of the steam toaster oven. A series of input keys 62 is used to enter cooking parameters. Finally, a start key 64, a stop key 66 and a reset/clear key 68 are used to initiate or terminate a cooking or toasting cycle. A manual steam control (not shown) could easily be incorporated into the control panel 11b.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A steam toaster oven, comprising:
   a housing having a cooking chamber;
   at least one heating element disposed in said cooking chamber;
   a reservoir supported by said housing for receiving water;
   transfer means connected between said reservoir and said cooking chamber for transferring water from said reservoir to said cooking chamber;
   a steam-generating vessel, disposed in said cooking chamber, said vessel being contiguously adjacent said at least one heating element over a portion thereof, said steam-generating vessel being heated by said at least one heating element over said contiguous portion, said steam-generating vessel being connected to said transfer means and receiving water therefrom, said water being converted to steam substantially instantaneously within said steam-generating vessel as said steam-generating vessel is heated by said contiguous portion of said at least one heating element, said steam-generating vessel having means for delivering the steam into said cooking chamber; and
   a control panel supported by said housing, said control panel including selector means for electing a rate for generating steam in said steam-generating vessel.

2. The steam toaster oven in accordance with claim 1, wherein said steam-generating vessel comprises a tube that is disposed contiguously adjacent said heating element.

3. The steam toaster oven in accordance with claim 2, wherein said tube is disposed contiguously adjacent said heating element and aligned therewith over said contiguous portion.

4. The steam toaster oven in accordance with claim 1, wherein said steam-generating vessel comprises a boiling chamber that is disposed contiguously adjacent said heating element.

5. The steam toaster oven in accordance with claim 1, wherein said steam-generating vessel comprises an open pan for boiling that is disposed contiguously adjacent said heating element.

6. The steam toaster oven in accordance with claim 1, wherein said reservoir comprises a metering valve that is operatively connected to said selector means, for metering a rate at which water is supplied to said steam-generating vessel.

7. The steam toaster oven in accordance with claim 1, wherein said means for delivering the steam into said cooking chamber from said steam-generating vessel comprises a plurality of orifices.

8. The steam toaster oven in accordance with claim 7, wherein said orifices are periodically spaced about said steam-generating vessel.

9. A microprocessor-controlled, steam toaster oven, comprising:
   a housing having a cooking chamber;
   at least one heating element disposed in said cooking chamber;
   a reservoir supported by said housing for receiving water;
   transfer means connected between said reservoir and said cooking chamber for transferring water from said reservoir to said cooking chamber;
   a steam-generating vessel, disposed in said cooking chamber, said vessel being contiguously adjacent said at least one heating element over a portion thereof, said steam-generating vessel being heated by said at least one heating element over said contiguous portion, said steam-generating vessel being connected to said transfer means and receiving water therefrom, said water being converted substantially instantaneously to steam within said steam-generating vessel as said steam-generating vessel is heated by said contiguous portion of said at least one heating element, said steam-generating vessel having means for delivering the steam into said cooking chamber;
   a sensor disposed in said cooking chamber for sensing temperature therein; and
   a microprocessor supported by said housing and operatively connected to said sensor for controlling a heating cycle of said steam toaster oven, in accordance with said temperature sensed by said sensor.

10. The microprocessor-controlled, steam toaster oven in accordance with claim 9, further comprising a control panel supported by said housing, said control panel including selector means for electing a rate for generating steam in said steam-generating vessel.

11. The microprocessor-controlled, steam toaster oven in accordance with claim 9, further comprising a humidity sensor disposed in said cooking chamber for sensing a level of humidity therein, said humidity sensor being operatively connected to said microprocessor, and providing said microprocessor with a signal representing said humidity level, so that said microprocessor can control a steam-generating cycle.

12. The microprocessor-controlled, steam toaster oven in accordance with claim 11, further comprising a control panel supported by said housing, said control panel including a selector means for electing a rate for generating steam in said steam-generating vessel, said control panel being operatively connected to said microprocessor for selecting a steam-generating cycle.

13. The microprocessor-controlled, steam toaster oven in accordance with claim 9, wherein said steam-generating vessel comprises a tube that is disposed contiguously adjacent said heating element.

14. The microprocessor-controlled, steam toaster oven in accordance with claim 13, wherein said tube is aligned with said heating element over a contiguous portion thereof.

15. The microprocessor-controlled, steam toaster oven in accordance with claim 9, wherein said steam-generating vessel comprises a boiling chamber that is disposed contiguously adjacent said heating element.

16. The microprocessor-controlled, steam toaster oven in accordance with claim 9, wherein said steam-generating vessel comprises an open pan for boiling that is disposed contiguously adjacent said heating element.

17. The microprocessor-controlled, steam toaster oven in accordance with claim 9, wherein said reservoir comprises a metering valve that is operatively connected to said selector means for metering a rate at which water is supplied to said steam-generating vessel.

18. The microprocessor-controlled, steam toaster oven in accordance with claim 9, wherein said means for delivering the steam into said cooking chamber from said steam-generating vessel comprises a plurality of orifices.

19. The microprocessor-controlled, steam toaster oven in accordance with claim 9, wherein said orifices are periodically spaced about said steam-generating vessel.

20. A microprocessor-controlled, steam toaster oven, comprising:

a housing having a cooking chamber;

at least one heating element disposed in said cooking chamber;

a reservoir supported by said housing for receiving water;

transfer means connected between said reservoir and said cooking chamber for transferring water from said reservoir to said cooking chamber;

a steam-generating vessel, disposed in said cooking chamber, said vessel being contiguously adjacent said at least one heating element over a portion thereof, said steam-generating vessel being heated by said at least one heating element over said contiguous portion, said steam-generating vessel being connected to said transfer means and receiving water therefrom, said water being converted to steam within said steam-generating vessel as said steam-generating vessel is heated by said contiguous portion of said at least one heating element, said steam-generating vessel having means for delivering the steam into said cooking chamber;

a sensor disposed in said cooking chamber for sensing operative conditions therein;

a control panel supported by said housing for selecting heating and steaming cycles; and a microprocessor supported by said housing and operatively connected to said sensor for controlling an operative cycle of said steam toaster oven, in accordance with said operative conditions sensed by said sensor.

* * * * *